United States Patent
Cannon et al.

[19]

[11] Patent Number: 5,980,044

[45] Date of Patent: Nov. 9, 1999

[54] AREA OF INTEREST DISPLAY SYSTEM WITH IMAGE COMBINING USING ERROR DITHERING

[75] Inventors: Bruce L. Cannon; Kenneth A. Poppleton, both of Salt Lake City, Utah

[73] Assignee: Evans & Sutherland Computer Corp., Salt Lake City, Utah

[21] Appl. No.: 09/153,969

[22] Filed: Sep. 16, 1998

[51] Int. Cl.[6] ................................................ G03B 21/14
[52] U.S. Cl. ............................ 353/30; 353/98; 353/121
[58] Field of Search ............................ 353/28, 30, 62, 353/98, 121; 434/43, 44; 359/888

[56] References Cited

U.S. PATENT DOCUMENTS

| | | | |
|---|---|---|---|
| 4,636,384 | 1/1987 | Neves et al. | 434/44 |
| 5,242,306 | 9/1993 | Fisher | 353/30 |
| 5,326,266 | 7/1994 | Fisher et al. | 434/44 |
| 5,329,323 | 7/1994 | Biles | 353/30 |
| 5,487,665 | 1/1996 | Lechner et al. | 353/30 |

OTHER PUBLICATIONS

"Infinite Reality: A Real–Time Graphics System." John S. Montrym, Daniel R. Baum, David L. Dignam, and Christopher J. Migdal, Computer Graphics Proceedings, Annual Conference Series, 1997.

*Primary Examiner*—William Dowling
*Attorney, Agent, or Firm*—Thorpe North & Western, LLP

[57] ABSTRACT

A method and apparatus for providing an improved area of interest display system by providing a transition zone between a high resolution image being reflected onto and a low resolution image being projected onto a display screen. A combiner surface is provided in the form of a mirror having an all-reflective surface which transitions to an all-transmissive surface. The transition occurs in the form of pixels of highly reflective material which are disposed on the combiner surface using a dithering pattern generated from a modified error diffusion algorithm which minimizes undesired grouping of pixels.

25 Claims, 4 Drawing Sheets

ABSTRACT# AREA OF INTEREST DISPLAY SYSTEM WITH IMAGE COMBINING USING ERROR DITHERING

BACKGROUND

1. The Field of the Invention

This invention relates generally to computer graphics systems. More specifically, the present invention provides a modification to an area of interest visual display such that a low resolution image and a high resolution image are more easily blended in a manner which does not bring attention to an observer's eyes of a transition area between them.

2. The State of the Art

Area of interest display systems are typically utilized in simulators. The term "area of interest" refers to a section of a display which is of most interest and therefore watched by the observer. Typically, the most useful visual information is concentrated at this point, while a surrounding background image simply enhances a feeling of reality.

For example, a low resolution image is projected onto a display screen as background, while a high resolution image is combined with the low resolution image by being projected onto it. The high resolution image provides greater detail because it is a focal point of observational interest to the observer, hence it is the area of interest.

The high resolution image typically encompasses a small field-of-view and is inset into a wide field-of-view low resolution image. Consider a trainee who is seated in a flight simulator and observes a wide field-of-view display to simulate a view of an actual flight pattern. A trainee can therefore experience specific flight routes or patterns with considerable realism while seated in the training simulator.

It has been learned that as a result of limitations in human visual perception that a considerable portion of a wide field-of-view display may be of relatively poor quality and still attain substantial realism for the viewer. The key is to inset a high resolution image in the low resolution background image at the viewer's area of interest. Such area of interest systems take advantage of the high resolution viewing area of the eye (the fovea) being relatively small. Specifically, as the fovea of a normal eye subtends an angle of only about two degrees, the high resolution inset image can be relatively small in relation to the low resolution background or panoramic image.

A previously recognized problem in producing area of interest displays has been avoiding visible effects at a border between the low resolution and the high resolution images. Considerable effort has been expended in attempting to avoid incongruities that are disturbing and/or distracting to the viewer and which appear at the transition from the high resolution image to the low resolution image.

Although various solutions have been proposed to provide a visually acceptable transition between the images in an area of interest display, a need exists for an economical and effective process and apparatus to accomplish that end. In that regard, it is desirable to avoid the need for high precision optical alignment, exotic filtering or video systems requiring extensive hardware or critical operating requirements. In a related context, it is noteworthy that state of the art techniques presently suffer from substantial problems in attaining optical masks using proper sizing and proper optical density falloff.

To enhance the understanding of the state of the art which uses the techniques described above, FIG. 1 shows a system described in U.S. Pat. No. 5,326,266 issued to Fisher et al. (the '266 patent) which attempted to solve the problems of state of the art area of interest systems. The system 2 projects a composite picture on a view screen 8. A wide field, low resolution background image area 6 is indicated surrounding a high resolution inset area 4. The low resolution background image area 6 is generated by a background projector 5, while the high resolution inset area 4 is generated by a detail inset projector 7.

This system attempted to blend the images 4 and 6 at the view screen 8 by causing the border between the two areas 4 and 6 to vary in an orbital oscillating pattern to accomplish visual blending. Visual blending requires that a reflector plate 3 includes a transparent portion and an opaque portion, where the opaque portion reflects the inset area 4. The reflector plate 3 in this case is located at an intermediate image plane. Thus, one plate (the reflector plate 3) is used for both the background image and the inset image. The reflector plate 3 is then oscillated in the orbital pattern. This vibration is caused by an electro mechanical vibration drive 9 which is shown near the reflector plate 3.

FIG. 2 shows another state of the art system for creating a high resolution area of interest which is superimposed upon a lower resolution background display. In U.S. Pat. No. 4,634,384 issued to Neves et al. (the '384 patent), the system 20 uses a common servo optical arrangement for blending the inset area of interest with the background imagery. FIG. 2 shows that this system 20 uses beamsplitters 22 and multiple opaque filters 24 in the servo optical system. Accordingly, this system is disadvantageously complex and physically large in its implementation. This is partly due to the blend filters being specific to each channel, resulting in more filters being required. Furthermore, each filter must complement the filter in the other channel, even though the channels are physically separate from each other.

OBJECTS AND SUMMARY OF THE INVENTION

It is an object of the present invention to provide a method and apparatus for combining a low resolution image and a high resolution image using error diffusion dithering at a single image plane.

It is another object to provide a method and apparatus for achieving a transition between a low resolution image and a high resolution image which is indistinguishable to the human eye.

It is another object of the present invention to provide a method and apparatus for combining high and low resolution images by controlling a boundary between reflective material and a transmissive area on a combining plate.

It is another object of the present invention to provide a method and apparatus for combining high and low resolution images by varying a distribution of reflective "pixels" of a finite and controllable size.

It is another object of the present invention to provide a method and apparatus for controlling a distribution of the pixels using computer algorithms which provide a dithering effect to a density of metallic "pixels."

It is another object of the present invention to provide a method and apparatus for controlling a transition from an all-reflective area to a transmissive area.

It is another object of the present invention to provide a method and apparatus for controlling a distribution of the pixels using error diffusion that is included to eliminate undesirable "clumping" of pixels as the densities of pixels transition the part from all reflective to all transmissive, where the all reflective area corresponds to the high resolution image, and the all transmissive area corresponds to the low resolution image, and where the high resolution image and the low resolution image converge from two paths at a single image plane defined by the combining plate.

The presently preferred embodiment of the present invention is a method and apparatus for providing an improved area of interest display system by providing a transition zone between a high resolution image being reflected onto and a low resolution image being projected onto a display screen. A combiner surface is provided in the form of a mirror having an all-reflective surface which transitions to an all-transmissive surface. The transition occurs in the form of pixels of highly reflective material which are disposed on the combiner surface in an approximation of a continuous gradient which is created using a dithering pattern generated from a modified error diffusion algorithm which minimizes undesired grouping of pixels.

In one aspect of the invention, the combiner surface is a static mirror which substantially simplifies the area of interest display system.

In another aspect, distribution of the pixels on the mirror is controlled by a computer algorithm designed to provide a dithering effect. This is accomplished by varying the density of the reflective pixels within the transition zone between the totally reflective surface and the totally transmissive surface.

In another aspect, error diffusion is introduced via the computer program which controls pixel distribution to thereby eliminate undesirable "clumping" in pixel distribution.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
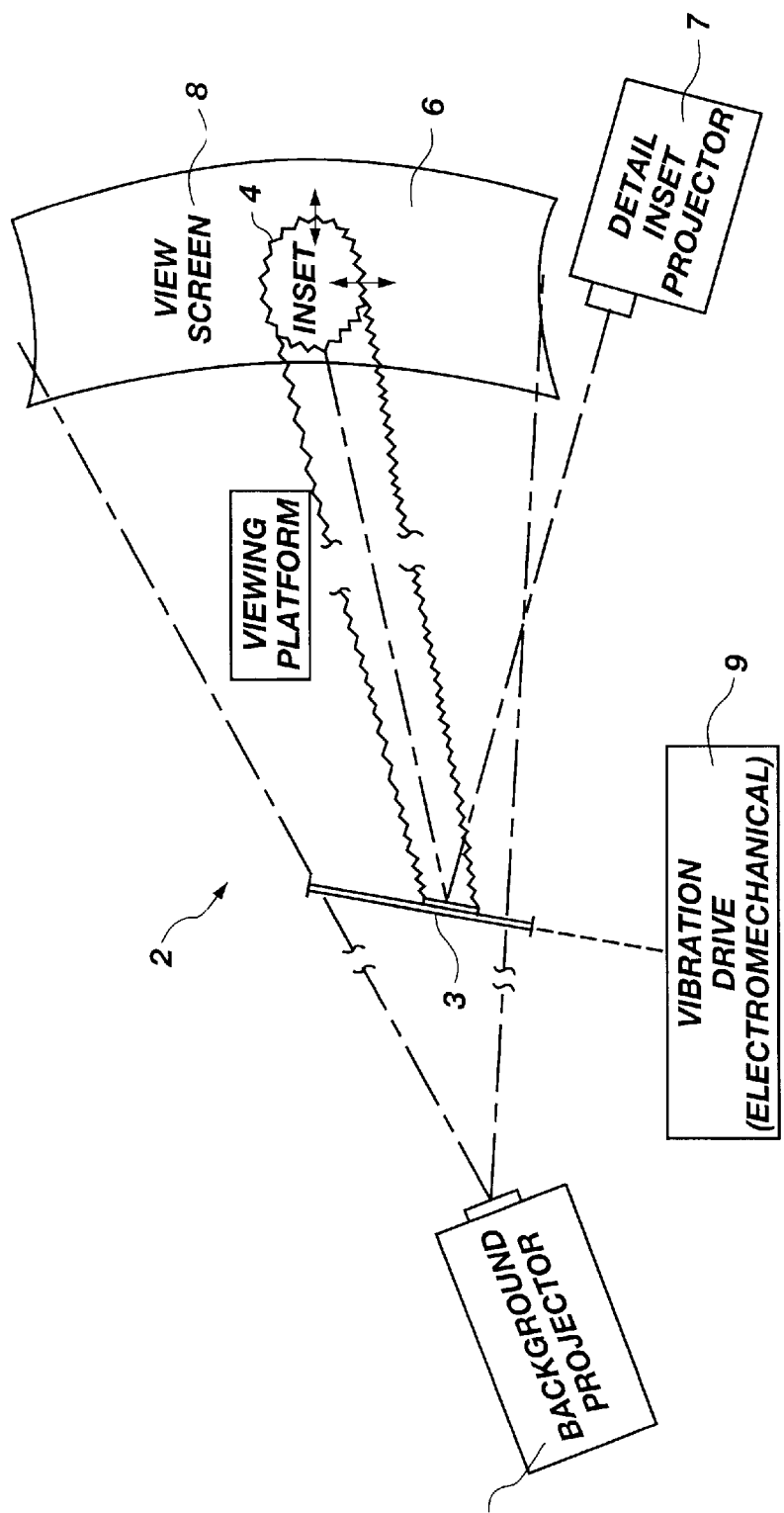
FIG. 1 is a perspective and diagrammatic view of a prior art area of interest display system which includes a vibrating mirror for reflecting a high resolution image onto the a display screen, where an electro mechanical vibration drive is used to mechanically vibrate the mirror to thereby more smoothly transition between the high and low resolution images.
Figure 2:
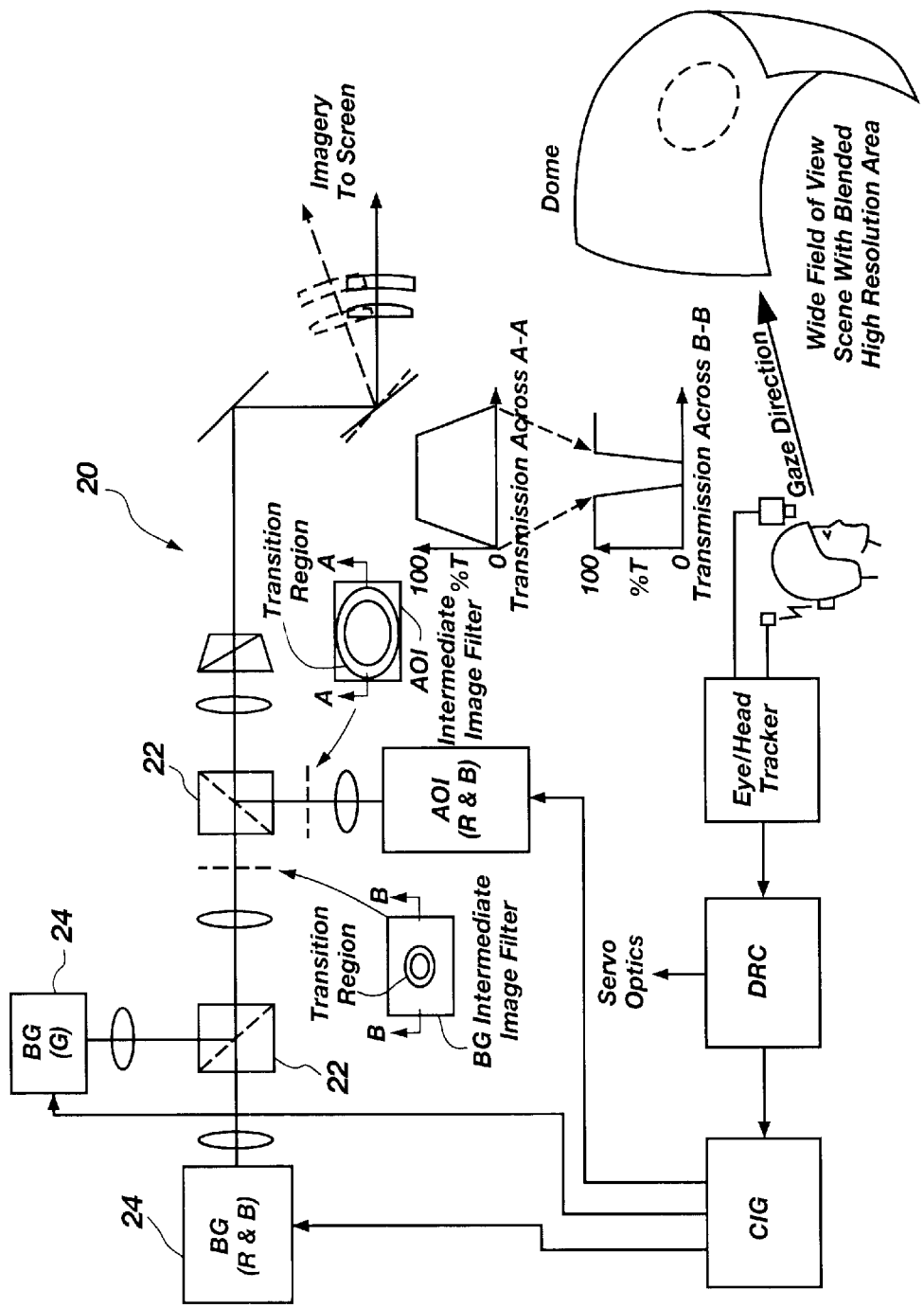
FIG. 2 is a block diagram of another prior art area of interest display system which utilizes a beam splitter and two intermediate-image filters to more smoothly transition between the high and low resolution images.

The preferred embodiment of the present invention is first differentiated from the state of the art system shown in FIG. 1 in that a reflector for the high resolution image is held stationary. This elimination of precision mechanically moving parts substantially increases the simplicity of the system. The remaining differences are discovered when closely examining the reflector of the high resolution image.

Figure 3:
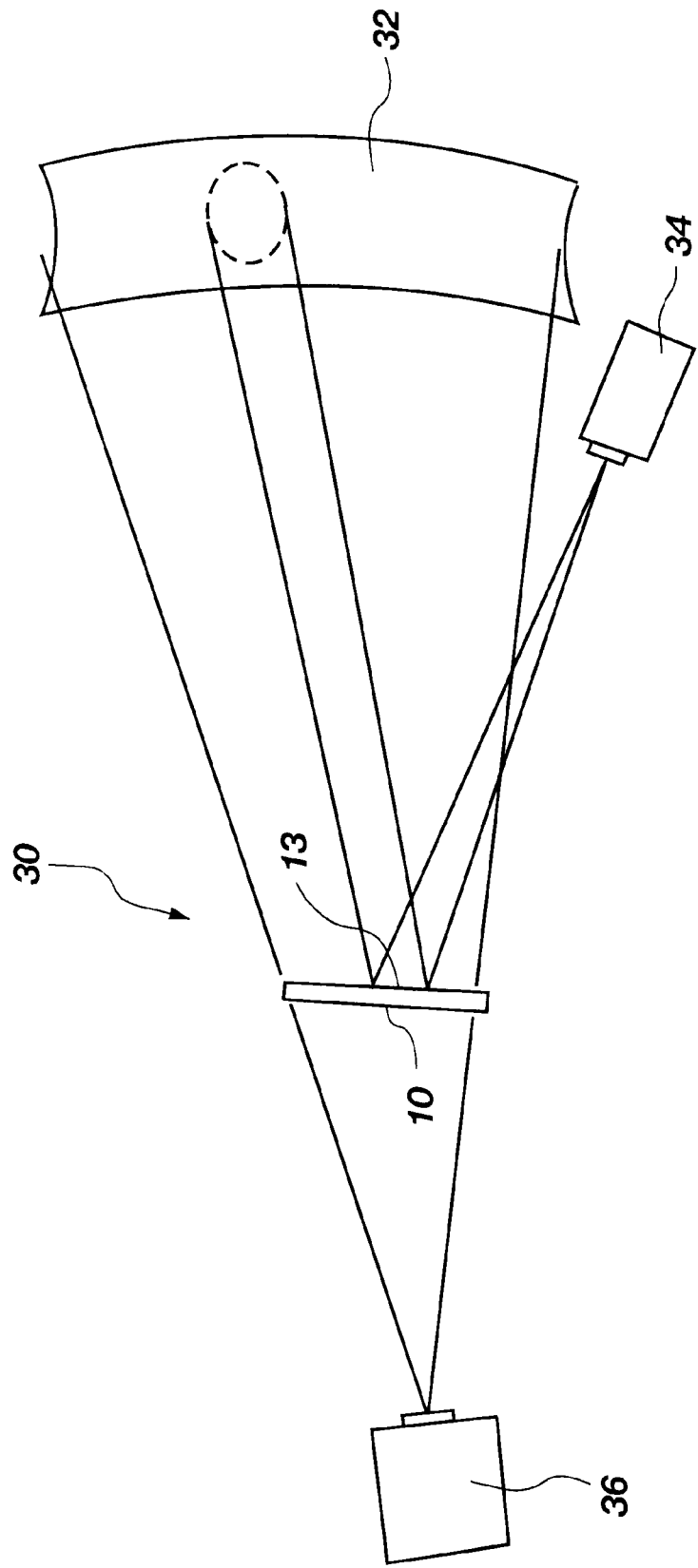
FIG. 3 is a profile view of the presently preferred embodiment of the area of interest display system using a static mirror which is able to combine high and lower resolution images.

To provide context for the invention, FIG. 3 is provided to show the placement of the basic elements of the area of interest display system of the present invention. The system 30 includes a reflector or combiner plate 10, a viewing screen 32, a high resolution image projector 34, and a lower resolution background image projector 36. This system 30 is substantially less complex than the system taught in the '266 patent because the electro mechanical vibration drive 9 as shown in FIG. 1 is not required to achieve the blending of high and lower resolution images on the display screen 32.

Another significant difference between the present invention and the '266 patent is the reflector plate 10 of FIG. 3. Elimination of the electro mechanical vibration drive 9 of FIG. 1 is possible by the placement of a specific pattern of pixels on the reflector plate 10. The pixel pattern is selected in accordance with the principles of error diffusion as will now be explained.

Figure 4:
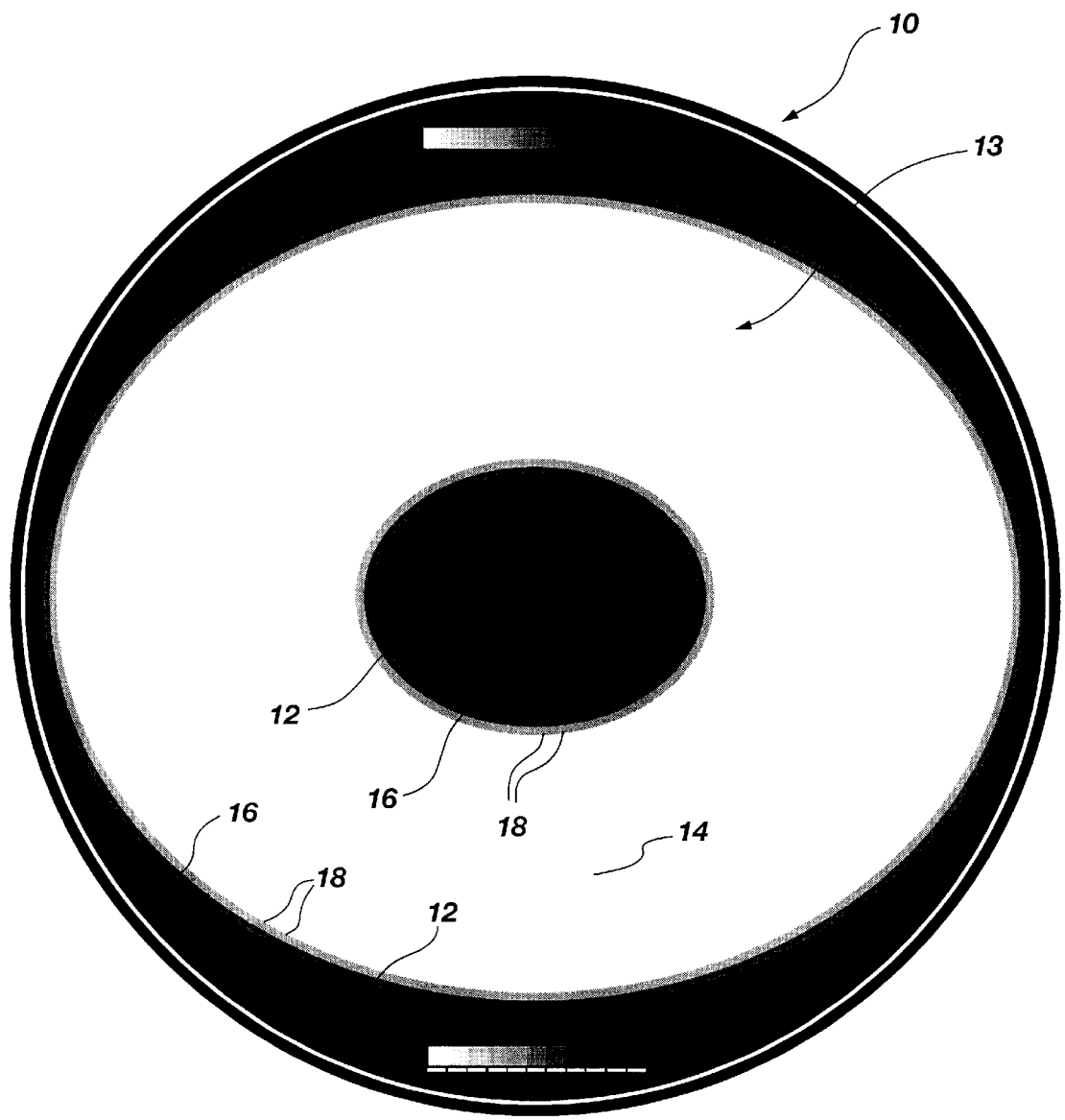
FIG. 4 is an elevational view of a presently preferred embodiment of a combiner plate which shows a front face of a combiner surface which has been constructed in accordance with the principles of the present invention. The front face illustrates the portions of the surface which are reflective as black, and the portions of the surface which are transmissive as white.

FIG. 4 is an elevational view of a front face 13 of the reflector plate (also to be referred to as a combining plate) 10 referred to above, and is made in accordance with the presently preferred embodiment of the present invention. Advantageously, the combining plate 10 requires no moving parts to cause blending of a low resolution image which is transmitted through the plate, and a high resolution image which is being reflected therefrom. The result is a simple arrangement which does not require complex servo systems to control the image projection. The simplicity also results in a more cost-effective system as compared to the state of the art.

The combining plate 10 includes black regions 12 which represent areas which have deposited thereon a highly reflective material. The highly reflective material reflects the high resolution image so that it is projected onto the display screen 32. In contrast, the white area 14 in FIG. 4 represents a non-reflective (completely clear or transmissive) region. Portions of the high resolution image which are projected onto the white area 14 are thus not reflected onto the display screen 32.

What is critical to the success of the presently preferred embodiment, and which results in a blending of the high resolution image and the low resolution image on the display screen, is a transition zone or region 16 which appears between the reflective regions 12 and the non-reflective region 14. As already explained, it is typically very difficult to obtain an adequate blending of the high and low resolution images on the display screen, especially without suffering undesirable image artifact. In the present invention, the transition zone 16 effectively blends the low and high resolution images using a dithering effect.

It should be noted that another distinction between the present invention and the prior art is that the combining plate 10 is located at an intermediate image at the combining plate. In other words, the final image has been generated (combined) at the combining plate 10, and simply becomes visible at the view screen 32. This is contrast to the '384 patent which provides two separate filters for the two separate images that are being combined.

The dithering effect is characterized as causing a gradual transition between the low and high resolution images. This is accomplished by distributing pixels 18 of the highly reflective material into the transition zone 16. In FIG. 4, the pixels 18 are distributed in accordance with a specific distribution pattern. This pattern approaches a continuous gradient. This does not mean that the distribution pattern is linear, but it is a mathematically describable transition from 100 percent reflective to zero percent reflective. The distribution pattern is selected in this preferred embodiment utilizing a computer algorithm.

Some of the advantages of the distribution pattern created by the computer algorithm are that the distribution pattern is very consistent throughout the transition zone 16. In other words, there is no undesirable clumping or grouping together of pixels 18 which would likely cause the blending of the low and high resolution images to not be uniform. If there were clumping, the blending of images would not occur smoothly, and would probably be distracting to the observer. Therefore, another advantageous feature of the present invention is that in the computer algorithm utilized to establish the distribution pattern of the preferred embodiment, error diffusion is included to eliminate the clumping.

The distribution pattern of the pixels 18 is also characterized by transitioning from an area of higher concentrations of pixels to lower concentrations. The highest pixel concentrations are nearest to the reflective region 12, and the lowest pixel concentrations are nearest to the non-reflective or transmissive region 14.

Although difficult to discern, it should also be noted that the pixels 18 can be of varying sizes. The size of the pixels 18 is adjustable in order to assist in controlling the blending of the low and high resolution images. This size adjustment is much easier to perform than trying to control the boundary on a molecular level using varying deposition thicknesses of reflective material. Accordingly, the present invention advantageously makes pixels of varying macroscopic sizes. However, the pixels are still small enough so that when projected to a viewing screen, they appear smaller than the scenery (background) pixels that come from a projector source.

It is useful to discuss several aspects of the invention which are not readily apparent when constructing an area of interest display system as described in the preferred embodiment above. These aspects are a result of the invention having to use a combination of disciplines. These disciplines include an understanding of computer graphics so that error diffusion can be used to generate the pixel pattern, knowledge of the PrePress industry so that a 10× image of the pixel pattern can be printed, and an understanding of photolithography in order to reduce the 10× image to generate a 1× master image and etching the 1× master image onto the combining plate.

As an introduction to the use of these disciplines, it is first noted that the inventors attempted to make the combining plate using a continuously varying reflective material, both in silver and aluminum. The physical process used to deposit these reflective metallic coatings requires a careful setup in a metal deposition chamber, either with a mask that is at a controlled distance from the glass combining plate, or with a mask that is close to the glass combining plate, but moving during the entire deposition process. As referred to previously, one phenomena encountered during the deposition process was that the depositing metal was not controllable at a molecular level. The deposition process would result in the formation of clumps at varying densities, and the overall transition was perceivably inconsistent.

The inventors then turned to photolithography to create a combining plate, resulting in the presently preferred embodiment. In the present invention, the photolithographic distribution process being utilized begins with the step of making a photolithographic mask for metallic deposition. This process requires several steps.

The first step is to generate a computer file that will make a master image (pre-production image) that will generate a final combining plate image that is 10 times (10×) larger than the desired size of the final combining plate. The next step is to print the pre-production image at the 10× image size. The next step is to photograph the pre-production master image with a high resolution camera onto a durable glass/chromium master image plate that is at a ratio of 1:1 (1×) relative to the desired combining plate. In other words, this step reduces the pre-production image 10 times. The next step is to use the 1× master image to control exposure onto a final glass substrate (the final combining plate). The final glass substrate has a photosensitive layer, and a final reflective-metallic layer. Proper photo exposure enables the selective removal of the metallic layer, leaving only the transparent glass substrate.

In light of the preferred embodiment above, it should be explained that it is not required that the pre-production image be created at a size that is larger than the final image used for the combining plate. Accordingly, any convenient magnification can be used (5× or 20×), or even no magnification at all (1×).

Although silicon wafer technology currently enables resolution and details of smaller than 1 micron, it was discovered that with the characteristics of the reflective materials beings used and of the modern photo equipment, a pixel size of approximately 3 to 5 microns was adequate for the presently preferred embodiment. This pixel size was arrived at through several trials which were made to control the factor of repeatability when creating metal/pixel densities from 100% reflective through 100% transmissive.

The selection of pixel size is important in obtaining a predictable and repeatable transition zone. Accordingly, there are several factors which are balanced in selecting the correct pixel sizes. One factor is that pixels must be small enough that they are not perceptible in the projected image. This implies that the pixel size should be as small as the process will permit. In the presently preferred embodiment, the capabilities of the equipment being used limits the process to a particular pixel size in the printing of the 10× enlarged master film image, the transfer to a chromium 1× master image, and in the final etching on the glass substrate. In each of these three steps, pixels that are too small result in individual pixels being lost and only groups of pixels being created. Pixels that are too small also result in the clumping of closely separated pixels.

Another factor to be remembered is that the size of a single printed pixel should be the same size as a hole left by a single missing pixel in an otherwise solid (opaque) area. If the size of the single pixel does not match the single hole size, then the transition area will be shifted from its specified location.

Another factor controlling pixel size is the need to keep the number of on/off transitions to a minimum and thus to use the largest pixel size available. This is a result of the loss of light scattered by the edges of the on/off transitions (pixels). For each transition from on to off and off to on, the edge of the metal causes some light to be scattered. The loss of light at these edges results in a perceived dark band in the transition zone near a zone of approximately 50% transmission/reflectance. By using larger pixels, the area of the transition zone which is taken up by edges is minimized and the dark banding is reduced.

Two other considerations which encourage the use of larger pixels are the size of the data file required to make the 10× enlarged master film image, and the amount of computer time required to create the data file.

Regarding the error diffusion algorithm used by the presently preferred embodiment, it is a variation on the classic Floyd-Steinberg error diffusion algorithm. Using the classic algorithm, a desired transmission value for a pixel would be compared to a threshold. If the desired value is above the threshold, then the pixel's output value is set to 100%. Otherwise, it is set to 0%. An error value is computed as the difference between the desired transmission value and the pixel's output value. The error is then diffused to the neighboring pixels which have not yet been computed. This diffused value for the neighboring pixels is added to the neighbors computed desired transmission. Diffusion is such that the next pixel on a same line (forward) receives $7/16$ths of the error, the pixel directly below receives $5/16$ths, the pixel below and forward receives $3/16$ths, and the pixel below and back one receives $1/16$ h of the error. This spreads or diffuses the effect of the error caused by having to print the pixel as full on or off over several pixels in the image.

The variation utilized by the presently preferred embodiment is to process the image in a bidirectional fashion. The bidirectional processing means that the process is applied to the first line from left to right (as is normally performed), but applied to the next line from right to left, switching directions for each line of pixels. The result of this variation is an improved appearance of the edges on the left side of the transition regions by allowing them to diffuse to the left as much as the right side of the transition regions diffuse to the right.

Regarding the data file generated for the pixel pattern for the final combining plate, it can be relatively large. Selection of a file format for the date file which allows for compression is essential in being able to manage the data file. originally, the Postscript(™) language was used for the format of the data file. However, it was discovered that while this is adequate for small proof prints, the printing of larger images resulted in too large of a file for a printer to handle. To generate the 10× enlarge master film (10× artwork), a file format had to be selected which is compatible with printers that can handle the physical size of the 10× artwork, and which had an available format code. Furthermore, the final size of the data file had to fit on a mobile storage medium. Accordingly, the SciTex BW run length encoding format was selected because the format of the code was available from the owner of the encoding format, and a SciTex printer is also capable of printing the 10× artwork images needed. However, it should be realized that any equivalent encoding format and printer can be used.

It is useful to summarize the differences between the present invention and the state of the art area of interest display systems. The '266 patent is shown to use an electro mechanical system for vibrating a mirror to thereby soften the edges between a high resolution inset image and a lower resolution background image. Because of the moving parts needed to vibrate the mirror, the combining assembly has to be accessible for maintenance and adjustment. However, making the combining plate accessible resulted in the introduction of foreign material on the combining plate. Furthermore, cleaning of the combining plate would typically introduce scratches on the surface thereof because the metallic coating is not very durable.

In contrast, the '384 patent describes a complicated system of beam splitters and filters to optically blend the high resolution and the lower resolution images. These systems are generally costly, large, and complex because they require a high degree of precision alignment.

In contrast, the present invention is relatively simple, compact, inexpensive and is yet a very effective method of combining high and lower resolution images. The present invention advantageously combines the high and the lower resolution images at the combining plate 10 using a pattern of pixels at transition boundaries which thus serve to soften the edges between images, and which result in both images being present at the combining plate. The result is an image on a display screen which does not distract a viewer. Furthermore, it is important to remember that the combination of the high and low resolution images are combined using a pixel pattern which is based upon error diffusion dithering.

With no moving parts, the combining plate of the present invention can also be packaged as a field-replaceable field unit. This unit provides windows to enable projections of the images onto the combining plate. Because the windows would not be at an image plane in the optics of the system, any foreign matter would not be visible in the final image. Furthermore, these windows can be easily cleaned because they do not have the fragile metal layer that is on the combining plate. In addition, an inert gas is inserted into the sealed unit to keep the metal on the combining plate from oxidizing and discoloring over time.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. An area of interest display system wherein an area of interest includes a narrow field-of-view high resolution image which is displayed in a spatial position of a foveal region of an eye of an observer, and wherein background imagery of relatively low resolution is displayed about the area of interest imagery on a display screen, said system comprising:

a first display means for projecting said area of interest imagery;

a second display means for projecting said background imagery and defining an area to receive said area of interest imagery; and a stationary means for combining the area of interest imagery and the background imagery, wherein said stationary combining means includes:

at least one region of highly reflective material for reflecting the area of interest imagery, at least one clear region which is devoid of any reflective material, and a transition zone between the at least one highly reflective region and the at least one clear region, wherein the transition zone enables blending between the high resolution imagery being reflected from the highly reflective material, and the low resolution imagery.

2. The area of interest display system as defined in claim 1 wherein the transition zone further comprises a region of pixels made of the highly reflective material, and which are disposed in the transition zone such that the pixels are more concentrated in total number nearer the at least one region of highly reflective material and which are less concentrated in total number nearer the at least one clear region.

3. The area of interest display system as defined in claim 2 wherein the pixels of highly reflective material are distributed in a specific pattern which causes blending of the high resolution image and the low resolution image.

4. The area of interest display system as defined in claim 2 wherein a size of the pixels of highly reflective material is adjustable so as to provide a maximum blending effect between the high resolution image and the low resolution image.

5. The area of interest display system as defined in claim 3 wherein the distribution pattern further comprises a distribution in accordance with a modified error diffusion algorithm to thereby eliminate any undesirable grouping of the pixels of highly reflective material in the transition zone.

6. The area of interest display system as defined in claim 1 wherein the stationary means further comprises a glass combining plate.

7. The area of interest display system as defined in claim 6 wherein the system further comprises a sealed housing wherein the stationary means is disposed, said sealed housing including window means such that the area of interest imagery and the background imagery can be projected towards the stationary means through the window means, and a combined image can be projected therefrom towards the display screen.

8. The area of interest display system as defined in claim 7 wherein the sealed housing has disposed therein at least one inert gas to thereby protect the glass combining plate.

9. The area of interest display system as defined in claim 1 wherein the stationary means for combining the area of interest imagery and the background imagery defines an intermediate image at which said area of interest imagery and said background imagery are combined.

10. A method for combining a low resolution image and a high resolution area-of-interest image together on a display screen such that the low resolution image and the high resolution image are blended together so as not to distract an eye of an observer, said method comprising the steps of:
   (1) projecting the low resolution image through transparent portions of a combining plate and onto the display screen;
   (2) projecting the high resolution image indirectly onto the display screen by partially reflecting said image off reflective portions of the combining plate; and
   (3) providing a transition region which is partially reflective and partially transparent on the combining plate which enables the low resolution image and the high resolution image to be combined and blended together on the display screen so as not to distract the eye of the observer.

11. The method as defined in claim 10 wherein the method further comprises the step of disposing a plurality of pixels composed of a highly reflective material on a surface of the combining plate to thereby form the transition region, wherein the high resolution image is thereby reflected off of the highly reflective material and onto the display screen.

12. The method as defined in claim 11 wherein the method further comprises the step of dithering a distribution of the pixels in the transition region of the combining plate such that pixels are disposed within the transition region in a distribution pattern which is more concentrated at a first end of the transition region and is less concentrated at an opposite second end of the transition region.

13. The method as defined in claim 12 wherein the step of dithering a distribution pattern of the pixels in the transition region further comprises the step of adjusting a size of the pixels to thereby assist in a dithering effect.

14. The method as defined in claim 12 wherein the step of dithering the pixels within the transition region further comprises the step of creating the dithered distribution utilizing a modified error diffusion algorithm to thereby achieve more control over pixel distribution, and eliminate any undesirable grouping of the pixels of highly reflective material in the transition region.

15. The method as defined in claim 14 wherein the modified error diffusion algorithm includes the step of processing pixel data in a bidirectional manner.

16. The method as defined in claim 15 wherein the method of processing pixel data in a bidirectional manner further comprises the steps of:
   (1) processing a first line of pixel data from left to right;
   (2) processing a subsequent line of pixel data from right to left, to thereby ensure that the pixels on a left side of a transition region diffuse to the left as much as the pixels on a right side of the transition region diffuse to the right; and
   (3) alternating subsequent directions of processing pixel data when moving from line to line.

17. The method as defined in claim 11 wherein the method further comprises the step of disposing the combining plate within a housing through which the high resolution image and the low resolution can be projected, to thereby protect a surface of the combining plate.

18. The method as defined in claim 17 wherein the method further comprises the step of disposing at least one inert gas within the housing to thereby minimize oxidation and discoloration of the highly reflective material on the combining plate.

19. The method as defined in claim 10 wherein the method further comprises the step of creating the reflective portions of the combining plate using a photolithographic process to deposit the highly reflective material on the combining plate.

20. The method as defined in claim 19 wherein the method further comprises the step of utilizing a photolithographic process to generate a photolithographic mask for metallic deposition, said method comprising the steps:
   (1) generating a computer data file for storing image data for creating an pre-production image, wherein the image data represents the distribution of pixels on the combining plate;
   (2) printing the image data to thereby generate the final image; and
   (3) photographing the pre-production image onto a glass/chromium master film image to thereby generate the final image.

21. The method as defined in claim 19 wherein the method further comprises the steps of:
   (1) generating the computer data file for storing image data for creating an pre-production image that is physically larger in size than a final image, wherein the image data represents the distribution of pixels on the combining plate;
   (2) printing the image data to thereby generate the pre-production image at the larger size relative to the final image; and (3) photographing and reducing the pre-production image onto a glass/chromium master film image to thereby generate the final image at the final image size.

22. The method as defined in claim 21 wherein the method further comprises the step of creating the combining plate using the photolithographic mask, said method comprising the steps of:
   (1) providing the glass combining plate with a photosensitive layer of material and the highly reflective material thereon; and
   (2) utilizing the photolithographic process to selectively remove portions of the highly reflective material to thereby expose the transparent portions of the combining plate.

23. The method as defined in claim 10 wherein the method further comprises the step of minimizing a loss of light that is caused by light scattering from edges of the pixels forming the reflective portions of the combining plate, said method comprising the step of selecting a size for the pixels such that a total number of pixels in the transition zone is minimized.

24. The method as defined in claim 10 wherein the method further comprises the step of reducing a dark band within the transition zone caused by edges of the pixels forming the reflective portions of the combining plate, said method comprising the step of selecting a size for the pixels such that a total number of pixels in the transition zone is minimized.

25. The method as defined in claim 10 wherein the method further comprises the step of combining the low resolution image and the high resolution image at the combining plate.

* * * * *